(12) United States Patent
Chaignat et al.

(10) Patent No.: US 7,823,476 B2
(45) Date of Patent: Nov. 2, 2010

(54) SINGLE DIRECTION COUPLING DEVICE AND CORRECTION DEVICE INCLUDING THE SAME

(75) Inventors: Julien Chaignat, Le Landeron (CH); Marco Bettelini, Prêles (CH)

(73) Assignee: ETA SA Manufacture Horlogère Suisse, Grenchen (CH)

( * ) Notice: Subject to any disclaimer, the term of this patent is extended or adjusted under 35 U.S.C. 154(b) by 0 days.

(21) Appl. No.: 12/062,919

(22) Filed: Apr. 4, 2008

(65) Prior Publication Data

US 2008/0245171 A1    Oct. 9, 2008

(30) Foreign Application Priority Data

Apr. 4, 2007    (EP) .................... 07105670

(51) Int. Cl.
*F16H 55/17* (2006.01)
(52) U.S. Cl. .................... 74/437; 368/145; 368/146; 368/147
(58) Field of Classification Search ............. 74/434, 74/437; 368/185, 190, 206, 216, 145–147; 968/23
See application file for complete search history.

(56) References Cited

U.S. PATENT DOCUMENTS

| | | | | |
|---|---|---|---|---|
| 161,262 A * | 3/1875 | Moseley | ................. | 368/196 |
| 1,036,954 A * | 8/1912 | Bell | ................. | 368/146 |
| 1,538,494 A | 5/1925 | Tucker | | |
| 3,104,517 A * | 9/1963 | Wuthrich | ................. | 368/148 |
| 3,360,922 A * | 1/1968 | Rogers | ................. | 368/35 |
| 3,487,631 A * | 1/1970 | Morita | ................. | 368/32 |
| 3,735,583 A | 5/1973 | Bachmann | | |
| 3,851,540 A * | 12/1974 | Tutiya | ................. | 74/437 |
| 3,855,785 A * | 12/1974 | Ushikoshi | ................. | 368/36 |
| 5,083,300 A * | 1/1992 | Schwartz | ................. | 368/185 |
| 5,303,213 A * | 4/1994 | Kaelin | ................. | 368/185 |
| 5,666,854 A | 9/1997 | Buri et al. | | |
| 6,295,249 B1 * | 9/2001 | Takahashi et al. | ............. | 368/35 |
| 6,802,645 B2 | 10/2004 | Ludwig | | |
| 7,563,020 B2 * | 7/2009 | Pittet | ................. | 368/190 |
| 2006/0215498 A1 * | 9/2006 | Meier | ................. | 368/223 |

FOREIGN PATENT DOCUMENTS

| | | |
|---|---|---|
| CH | 347 139 | 7/1960 |
| CH | 493 874 | 8/1970 |

(Continued)

OTHER PUBLICATIONS

European Search Report issued in corresponding application No. EP 07 10 5670, completed Jan. 22, 2008.

(Continued)

*Primary Examiner*—Richard W Ridley
*Assistant Examiner*—Matthew A Johnson
(74) *Attorney, Agent, or Firm*—Griffin & Szipl, P.C.

(57) ABSTRACT

A single direction coupling device, including a first transmission member (10) fitted with a first saw-like contrate toothing (13), mobile in rotation about an axis XX and axially positioned by an elastic member (11), and a second transmission member (14) fitted with a second saw-like toothing (17), mobile in rotation about an axis YY, meshed with the first transmission member (10), characterized in that the XX axis is perpendicular to the YY axis.

4 Claims, 2 Drawing Sheets

FOREIGN PATENT DOCUMENTS

| | | |
|---|---|---|
| EP | 1 538 494 A1 | 6/2005 |
| FR | 1 491 183 | 9/1966 |
| JP | 48-035856 | 5/1973 |
| JP | 58-128556 | 8/1983 |
| JP | 59-160791 | 9/1984 |

OTHER PUBLICATIONS

Office Action issued in co-pending related U.S. Appl. No. 12/056,668, dated Mar. 30, 2010.

* cited by examiner

SINGLE DIRECTION COUPLING DEVICE AND CORRECTION DEVICE INCLUDING THE SAME

This application claims priority from European Patent Application No. 07105670.9, filed Apr. 4, 2007, the entire disclosure of which is incorporated herein by reference.

FIELD OF THE INVENTION

The present invention relates to the field of horology. It concerns more specifically a single direction coupling device. The invention also concerns a correction device including such a coupling device.

BACKGROUND OF THE INVENTION

Single direction coupling devices are used, in horology, for transmitting a movement of rotation in a single direction. They conventionally include two transmission members, one driving, the other being driven, which are secured to each other in a single direction of rotation and are uncoupled or detached in the other direction. Numerous single direction coupling devices are known to those skilled in the art, essentially between two transmission members with parallel or coaxial axes of rotation. Reference can be made to CH Patent Nos. 347 139, 493 874 and FR Patent No. 1 491 183 for further information on this type of coupling device.

Single direction couplings for transmitting a movement of rotation between two transmission members with concurrent perpendicular axes are also known. One example well known to those skilled in the art is the Breguet toothing coupling device, formed of two pinions each including a saw-like contrate toothing, cooperating with each other so as to mesh in a single direction of rotation, and uncoupled or detached from each other in the other direction of rotation. The two pinions are coaxial, but, in practice, the purpose of this coupling device is in fact to transmit a movement of rotation to a wheel whose axis is perpendicular to that of the pinions. Thus, the driven pinion generally includes a straight radial toothing, meshed with said wheel.

This type of coupling device is certainly highly efficient, but it is complex and expensive. In particular, the driven pinion including a Breguet toothing and a straight toothing, is a complicated part, which is difficult to manufacture.

It will be noted that this coupling device is mainly employed in a barrel winding device, in order to prevent activating the barrel in the opposite direction to the direction of winding. Thus, the winding device conventionally includes a sliding pinion fitted with a first Breguet toothing, mobile between a time-setting position and a winding position, and a winding pinion fitted with a second Breguet toothing, meshed with the sliding pinion in the winding position, and forming therewith a single direction coupling device. The winding pinion is also fitted with a straight radial toothing meshing with a crown gear wheel, which itself meshes with a ratchet mounted on a barrel. When the sliding pinion is rotating in a first direction of rotation, it meshes with the winding pinion, which drives the crown gear wheel. The latter in turn drives the ratchet, which winds the barrel. When the sliding pinion is rotating in a second direction of rotation, it is uncoupled or from the winding pinion, which is thus not driven in rotation, thus preventing improper manipulation of the barrel.

SUMMARY OF THE INVENTION

It is an object of the invention to propose a new single direction coupling device, for transmitting a movement of rotation from a first transmission member to a second transmission member whose axis is perpendicular to that of the first member. The design and manufacture of this coupling device is simplified compared to the Breguet type coupling device. The invention also proposes a winding device including this type of coupling device.

More specifically, the invention concerns a single direction coupling device, including a first transmission member fitted with a first saw-like contrate toothing, moving in rotation about an axis XX and axially positioned by an elastic member, and a second transmission member fitted with a second saw-like toothing, moving in rotation about an axis YY, and meshed with the first transmission member, characterized in that the XX axis is perpendicular to the YY axis.

Owing to the saw-like toothings of the first and second wheels, the coupling between the two transmission members occurs in a single direction of rotation.

The invention also concerns a device for winding a barrel including a pinion mounted on a winding stem with an axis of rotation XX, fitted with a first saw-like contrate toothing, moving between a first time-setting position and a second winding position and axially positioned in the winding position (B) by an elastic member, characterized in that the device further includes a crown gear wheel whose axis of rotation YY is perpendicular to XX, fitted with a saw-like contrate toothing in the second winding position, so as to form a single direction coupling device.

Owing to the saw-like inner toothing of the crown gear wheel, the pinion is directly meshed with the crown gear wheel, without an intermediary winding pinion. The winding device is thus considerably simplified.

BRIEF DESCRIPTION OF THE DRAWINGS

Other features and advantages of the present invention will appear more clearly from the following detailed description of an example embodiment of a coupling device and a barrel winding device according to the invention, these examples being given purely by way of non-limiting illustration, with reference to the annexed drawing, in which.

DETAILED DESCRIPTION OF THE ILLUSTRATIVE EMBODIMENTS

Figures 1, 3:
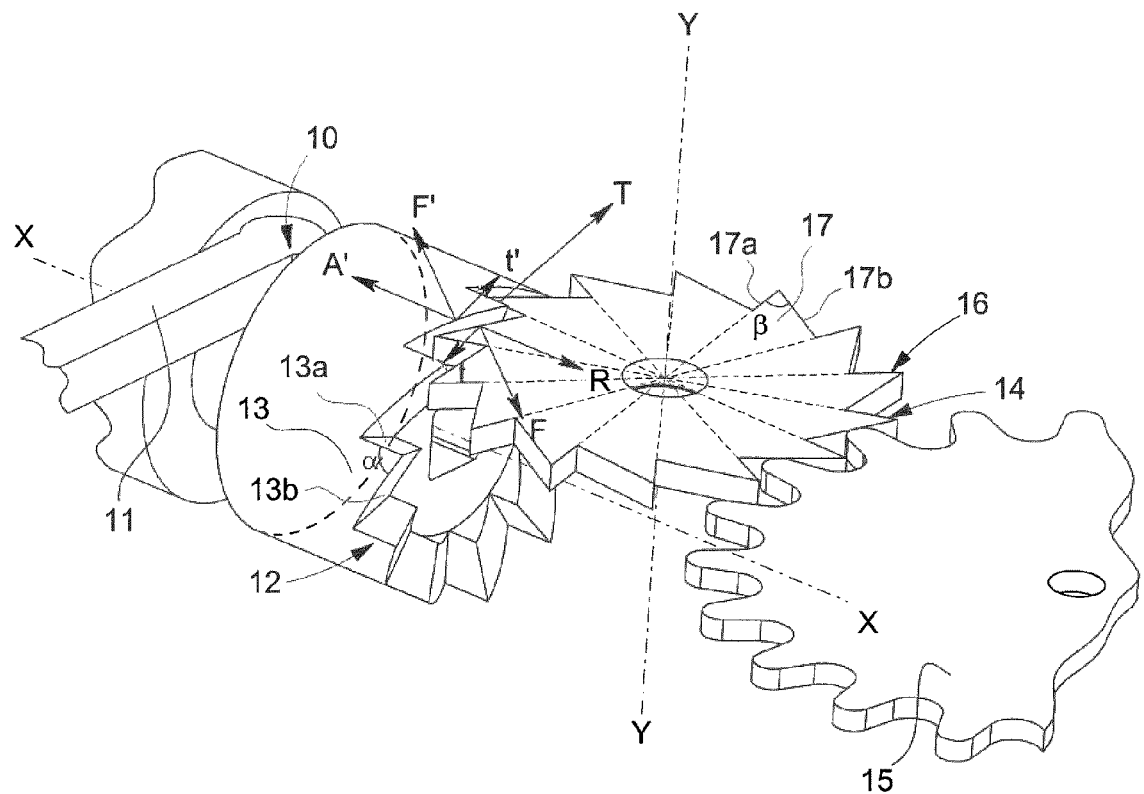
FIG. 1 is a perspective view of a coupling device according to the invention.
FIGS. 2 and 3 are respectively perspective and cross-sectional views of a barrel winding device according to the invention.

The coupling device illustrated in FIG. 1 includes a pinion 10 fitted with a Breguet toothing 12, moving in rotation about an axis XX. Pinion 10 is, for example, a sliding pinion, or any other pinion for a timepiece movement. The Breguet toothing 12 is well known to those skilled in the art: it is an axially cut toothing, or saw-like contrate toothing. Each tooth 13 includes a straight flank 13a substantially parallel to axis XX of pinion 10, and an oblique flank 13b forming an angle α with straight flank 13a.

Pinion 10 is mounted on a fixed or sliding pinion, for example on a winding stem. In both cases, it is held in the axial position by an elastic member 11, so that it can perform slight axial movements and return to its position.

Pinion 10 is meshed with a wheel 14 typically forming the first element of a timepiece gear train or of a correction device, symbolised by the reference 15. The gear train or correction device 15 are formed of various elements that are not shown, and are characterized by their friction force and, where necessary, the positioning force of one of the elements by a positioning element.

Wheel 14 is mobile in rotation about an axis YY. It is fitted with a saw-like toothing 16, formed of teeth 17 including a substantially radial straight flank 17a and an oblique flank 17b forming an angle β with straight flank 17a. Toothings 12 and 16 are formed and sized to be able to mesh with each other. In particular, angles α and β are substantially equal. Moreover, according to the invention, axes XX and YY are perpendicular. Advantageously, axes XX and YY are concurrent.

When sliding pinion is driving in a first clockwise direction of rotation, straight flanks 13a and 17a cooperate so as to transmit a substantially tangential force T to wheel 14. If force T is greater than the friction and positioning forces of the gear train or correction device 15, wheel 14 is driven in rotation, and the movement of rotation is transmitted from pinion 10 to wheel 14.

When pinion 10 is driving in a second clockwise direction of rotation, flanks 13b and 17b cooperate such that a force F, including a radial component R and tangential component t, is applied to wheel 14. In reaction, a force F' opposite to F, whose intensity depends upon the friction and positioning forces of gear train or correction device 15, is applied to pinion 10. Force F' includes an axial component A' and a tangential component t'. The axial and radial components A' and R are greater, the larger the angles α and β. If tangential component t is less than the friction or positioning forces of gear train 15 and axial force A' is greater than the axial positioning force of pinion 10 due to the elastic member 11, pinion 10 moves slightly on its axis XX, and wheel 14 is not driven in rotation.

The assembly of pinion 10-wheel 14 thus described forms a single direction coupling device, for the transmission of a movement of rotation from an axis XX to a an axis YY perpendicular to axis XX.

It will be noted that in the described embodiment, pinion 10 is driving and wheel 14 is being driven. Conversely wheel 14 could be driving and pinion 10 being driven. The forces in play are identical and generate a symmetrical result: pinion 10 in driven in rotation in a direction of rotation of wheel 14 and moves axially in the opposite direction of rotation.

It will be noted that, in a variant of the embodiment described, a crown gear wheel with an inner toothing could replace wheel 14. The operation of the coupling device remains unchanged.

Figure 2:
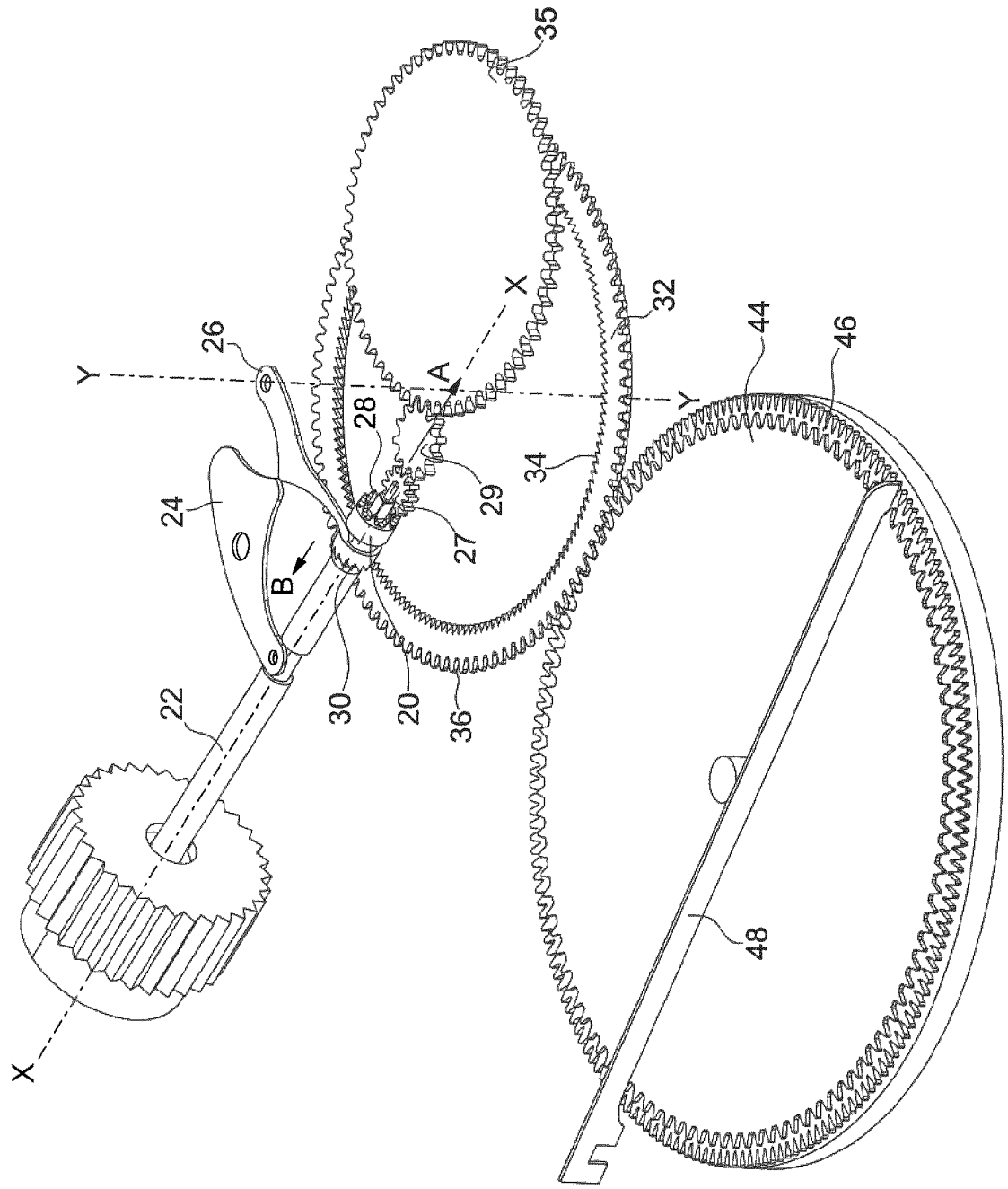

Reference will now be made to FIGS. 2 and 3, which illustrate schematically a barrel winding device using the single direction coupling device according to the invention.

The winding device according to the invention conventionally includes a sliding pinion 20, slidably mounted on a winding stem 22 between a time-setting position A and a winding position B. The changeover between time-setting position A and winding position B occurs conventionally using a mechanism formed of a pull-out piece 24 and a lever 26.

Sliding pinion 20 is fixedly mounted in rotation on the winding stem 22 with an axis of rotation XX. It includes a straight contrate toothing 28 and a saw-like contrate toothing 30. In the time-setting position A, the contrate toothing 28 cooperates with an first intermediate wheel 27, meshed with a second intermediate wheel 29, which is itself meshed with a motion work wheel 35. This arrangement is well known to those skilled in the art and will not be described further.

The winding device further includes a crown gear wheel 32 including a saw-like inner toothing 34, and a straight external toothing 36. The crown gear wheel 32 is mounted to rotate freely about an axis YY perpendicular to axis XX, for example on a gear train bar 38. Crown gear wheel 32 is therefore fitted with a protruding cylindrical portion 40 engaged in a circular groove 42 made in gear train bar 38. The straight toothing 36 meshes with a ratchet 44 mounted on a barrel 46. Ratchet 44 is held fixedly in rotation by a click spring 48. In a variant of this embodiment, the crown gear wheel is indirectly meshed with ratchet 44, via an intermediate wheel (not shown).

In the winding position, sliding pinion 20 cooperates with inner toothing 34 of crown gear wheel 32, and forms therewith a single direction coupling device of the type described above. In a first direction of rotation, crown gear wheel 32 is driven in rotation so as to wind barrel 46. In a second direction of rotation, the friction and positioning forces of the various elements, and the angles of toothings 28 and 34 are calculated such that sliding pinion 20 is moved slightly axially, without driving crown gear wheel 32.

The winding mechanism thus described does not include a winding pinion, an intermediate part between sliding pinion 20 and crown gear wheel 32. The winding pinion is a complicated and expensive part, and the omission thereof constitutes a considerable saving in space and complexity.

Of course, the coupling device and winding device according to the invention are not limited to the embodiments that have just been described and various simple alterations and variants could be envisaged by those skilled in the art without departing from the scope of the invention defined by the annexed claims.

What is claimed is:

1. A barrel winding device including:
(a) a pinion mounted on a winding stem with an axis of rotation XX, the pinion including a first saw contrate toothing, wherein the pinion is mobile between a first time-setting position and a second winding position, and axially positioned in the second winding position by an elastic member;
(b) a gear wheel having an axis of rotation YY perpendicular to the axis of rotation XX, the gear wheel including a saw inner toothing and a straight external toothing, wherein the saw inner toothing of the gear wheel meshes directly with the first saw contrate toothing of the pinion in the second winding position so as to form a single direction coupling device; and
(c) a barrel on which a ratchet is mounted, wherein the straight external toothing of the gear wheel meshes at least indirectly with the ratchet in the second winding position.

2. The barrel winding device according to claim 1, wherein the pinion further includes a second straight contrate toothing cooperating with a first intermediate wheel in the first time-setting position, wherein the first intermediate wheel is kinematically connected to a motion work wheel.

3. The barrel winding device according to claim 1, wherein in the second winding position, the gear wheel driven directly by the pinion winds the barrel by driving the ratchet mounted on the barrel in rotation.

4. The barrel winding device according to claim 1, wherein in the first time-setting position, the gear wheel does not wind the barrel via uncoupling of the pinion and the gear wheel.

* * * * *